(12) United States Patent
Jiang

(10) Patent No.: US 9,035,882 B2
(45) Date of Patent: May 19, 2015

(54) COMPUTER INPUT DEVICE

(76) Inventor: Peigen Jiang, Sammamish, WA (US)

( * ) Notice: Subject to any disclaimer, the term of this patent is extended or adjusted under 35 U.S.C. 154(b) by 249 days.

(21) Appl. No.: 13/341,913

(22) Filed: Dec. 31, 2011

(65) Prior Publication Data

US 2013/0169534 A1   Jul. 4, 2013

(51) Int. Cl.
*G06F 3/02* (2006.01)
*G06F 3/042* (2006.01)

(52) U.S. Cl.
CPC ............ *G06F 3/0213* (2013.01); *G06F 3/0421* (2013.01); *G06F 3/0428* (2013.01)

(58) Field of Classification Search
CPC ..................................................... G06F 3/0213
See application file for complete search history.

(56) References Cited

U.S. PATENT DOCUMENTS

| | | | |
|---|---|---|---|
| 5,341,133 A * | 8/1994 | Savoy et al. .................. | 345/168 |
| 6,008,798 A * | 12/1999 | Mato et al. .................... | 345/168 |
| 6,107,996 A * | 8/2000 | Franz et al. ................... | 345/172 |
| 6,107,997 A * | 8/2000 | Ure ............................... | 345/173 |
| 2004/0041791 A1 * | 3/2004 | Dunker ......................... | 345/168 |
| 2010/0146393 A1 * | 6/2010 | Land et al. .................... | 715/723 |
| 2010/0149009 A1 * | 6/2010 | Ito et al. ....................... | 341/120 |
| 2010/0149099 A1 * | 6/2010 | Elias ............................. | 345/168 |
| 2011/0199309 A1 * | 8/2011 | Chuang ......................... | 345/168 |
| 2012/0081283 A1 * | 4/2012 | Lee et al. ...................... | 345/157 |
| 2012/0256839 A1 * | 10/2012 | Suggs ........................... | 345/168 |
| 2013/0063356 A1 * | 3/2013 | Martisauskas ................ | 345/168 |

\* cited by examiner

*Primary Examiner* — Dwayne Bost
*Assistant Examiner* — Maheen Javed

(57) ABSTRACT

A computer input device is disclosed which comprised a keyboard having a plurality of keys for entering commands and characters into the computer, the keyboard having a designated surface area overlaying the plurality of keys, at least one of the plurality of keys being located outside of the designated surface area, a touch sensor for detecting one or more touches by one or more objects on the designated surface area of the keyboard, and an input processor configured to switch the keyboard into a mouse mode when the touch sensor having detected the designated surface area being touched by a single object, the input processor configured to switch the keyboard into a keyboard mode when the touch sensor having detected the designated surface area being touched by two or more objects.

11 Claims, 3 Drawing Sheets

COMPUTER INPUT DEVICE

BACKGROUND

The present invention relates generally to human input devices for computing systems, and, more particularly, to a computer keyboard and mouse combo device.

A most popular way to position a cursor on a computer display is to use a mouse, which functions by detecting two dimensional motions relative to its supporting surface. Physically, a mouse comprises an object held under one of a user's hands, with one or more buttons. Clicking or hovering (stopping movement while the cursor is within the bounds of an area) can select files, programs or actions from a list of names, or (in graphical interfaces) through small images called "icons" and other elements. For example, a text file might be represented by a picture of a paper notebook, and clicking while the cursor hovers over this icon might cause a text editing program to open the file in a window.

When mice have more than one button, software may assign different functions to each button. Often, a primary (leftmost in a right-handed configuration) button on the mouse will select items (primary click), and a secondary (rightmost in a right-handed) button will bring up a menu of alternative actions applicable to that item (secondary click).

While conventional mice can be highly accurate pointing devices for computers, being a separate device the conventional mice have some short-comings such as every time when a computer user wants to move a cursor, he or she has to move his or her hand away from the keyboard and to the mouse, and move the mouse as a physical object. It is not only less efficient but also may cause injury to the hand over an extended period of time of use.

As such, what is desired is a computer input device, particularly a pointing device, that does not rely on moving any additional object other than the user's fingers.

SUMMARY

The present invention discloses a computer input device which comprises a keyboard having a plurality of keys for entering commands and characters into the computer, and the keyboard having a designated surface area overlaying the plurality of keys, at least one of the plurality of keys being located outside of the designated surface area. The computer input device also comprises a touch sensor for detecting one or more touches by one or more objects on the designated surface area of the keyboard. The computer input device further comprises an input processor configured to switch the keyboard into a mouse mode when the touch sensor having detected the designated surface area being touched by a single object, and the input processor configured to switch the keyboard into a keyboard mode when the touch sensor having detected the designated surface area being touched by two or more objects.

The construction and method of operation of the invention, however, together with additional objects and advantages thereof, will be best understood from the following description of specific embodiments when read in connection with the accompanying drawings.

Figure 1:
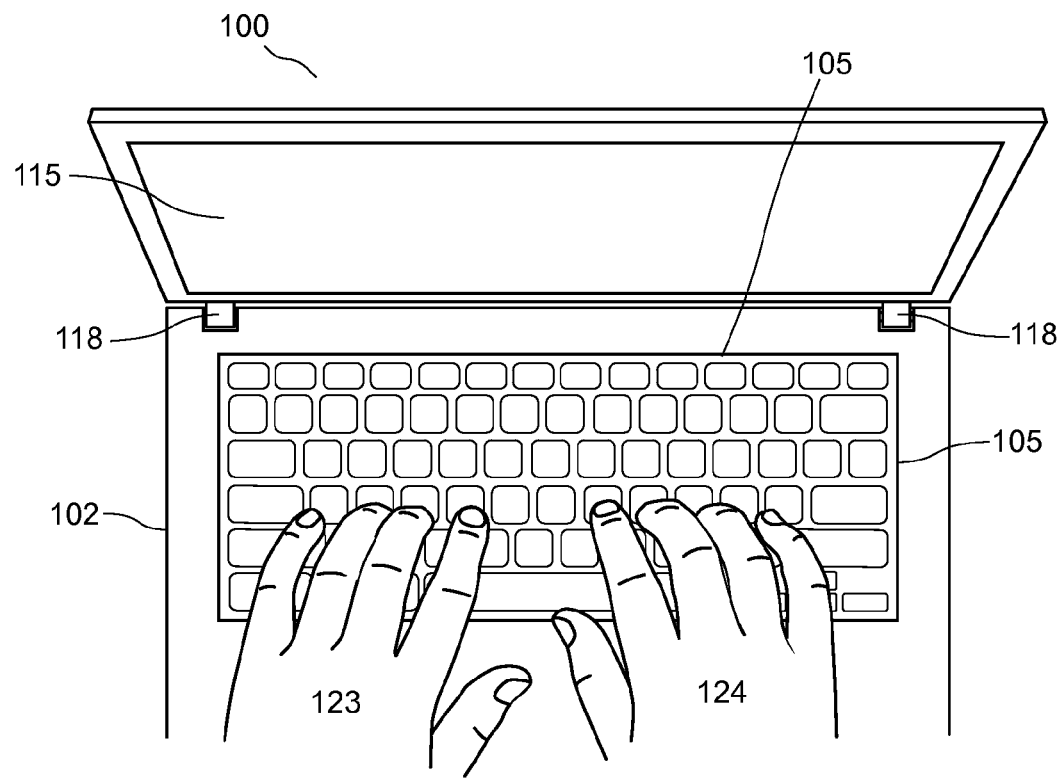
FIG. 1 is a perspective view of a laptop computer with a keyboard.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to a computer input device utilizing a touch sensing device and a conventional keyboard to provide cursor input for the computer. A preferred embodiment of the present invention will be described hereinafter with reference to the attached drawings.

FIG. 1 is a perspective view of a laptop computer 100 with a conventional keyboard 105 for entering text, etc. The laptop computer 100 has a base unit 102 containing the keyboard 105, and a display panel 115 which is hinged to the base unit 102 by hinges 118. A skilled computer user can generally type on the keyboard 105 with both hands 123 and 124.

Figure 2:
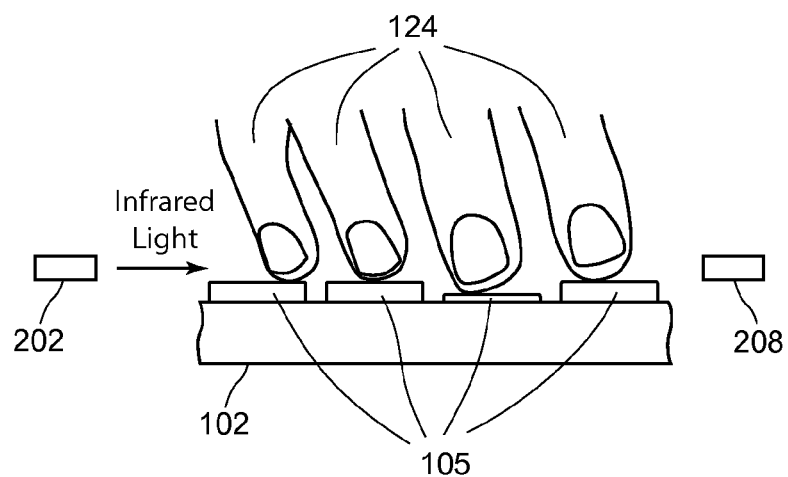
FIG. 2 illustrates an infrared-light touch sensing system positioned to detect touch on the keyboard surface according to an embodiment of the present invention.

FIG. 2 illustrates an infrared-light touch sensing system positioned to detect touches on the surface of the keyboard 105 according to an embodiment of the present invention. The infrared-light touch sensing system includes an infrared light emitter 202 and an infrared light receiver 208. The infrared light travels across the surface of the keyboard 105. A finger 124 or any other object touching the surface of the keyboard 105 blocks the infrared light from being received by the infrared light receiver 208. As a result, the touch can be detected.

Referring back to FIG. 1, the infrared light emitter 202 can be positioned along one edge of the keyboard 105 and the infrared light receiver 208 can be positioned along the opposite edge of the keyboard 105. In order to obtain coordinates of a touch, two sets of the infrared light touch sensors will be needed with one set positioned on the horizontal edges and the other on the vertical edges.

Although an infrared-light touch sensing system is described hereinbefore, other touch sensing systems, such as the one using a video camera can also be used.

Figure 3:
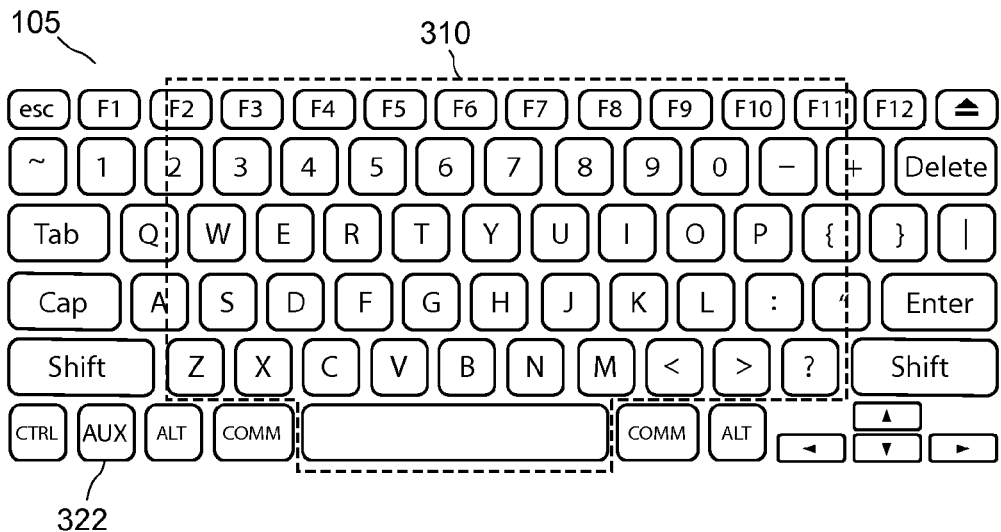
FIG. 3 is a layout diagram of keyboard keys according to the embodiment of the present invention.

FIG. 3 is a layout diagram of keys of the keyboard 105 according to the embodiment of the present invention. A predetermined touch sensing area 310 is designated by a keyboard-mouse combo software for detecting a touch and extracting coordinates of the touch. Only touches within the touch sensing area 310 can be detected as effective touches by the touch sensing system. The predetermined touch sensing area 310 can also be marked out on the surface of the keyboard 105, so that a computer user can clearly identify a boundary of the touching sensing area. The predetermined touch sensing area 310 functions akin to Apple's Magic Trackpad surface area. Apparently, the touch sensing area 310 has to be entirely covered by infrared light. Even though a touch on areas outside of the predetermined touch sensing area 310 can be picked up by the infrared-light sensing system, the keyboard-mouse combo software ignores such touch.

Figure 5:
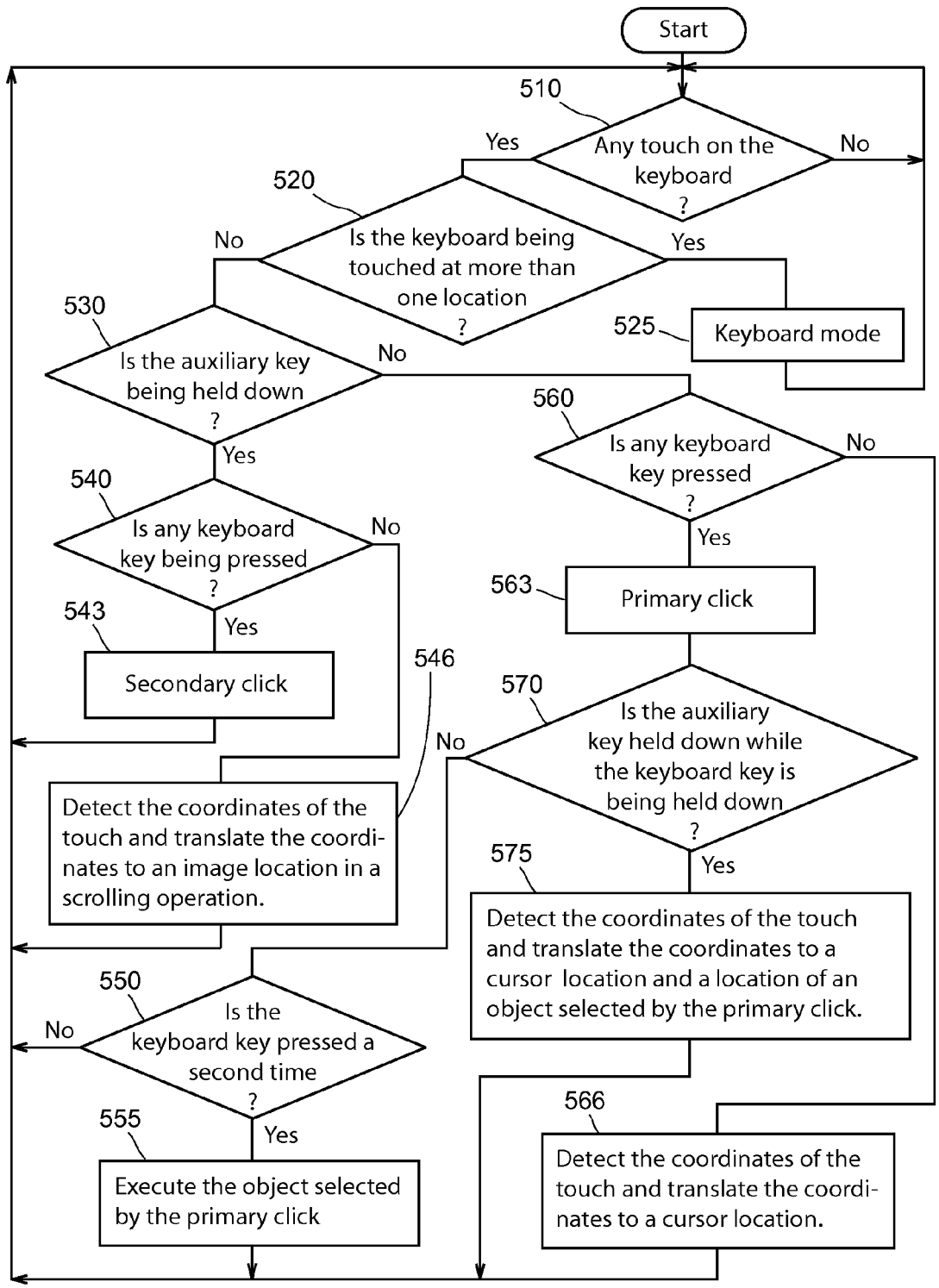
FIG. 5 is a flow chart diagram illustrating steps of operations of the keyboard-mouse combo device of the embodiment of the present invention.

Referring again to FIG. 3, there is a designated key 322 marked as "AUX" which stands for "auxiliary", outside of the predetermined touch sensing area 310. A main function of the "AUX" key 322 is for switching between a primary click and a secondary click. Operation details of the "AUX" key 322 are depicted in FIG. 5 and associated paragraphs hereinafter. Although only one "AUX" key 322 on the left hand side of the keyboard 105 is illustrated in FIG. 3, a skilled in the art would realize that another "AUX" key can be designated on the right hand side of the keyboard 105 as well.

Figure 4:
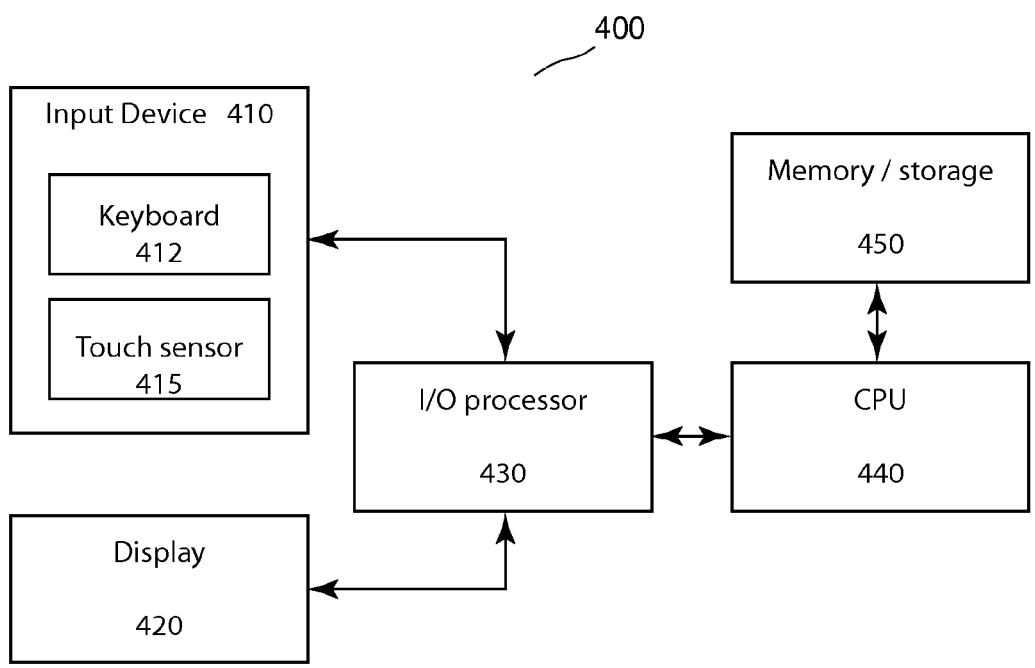
FIG. 4 is a block diagram of a computing system with a keyboard-mouse combo device according to the embodiment of present invention.

FIG. 4 is a block diagram of a computing system 400 with a keyboard-mouse combo device according to the embodiment of present invention. The computing system 400 includes an input device 410, a display 420, an input/output (I/O) processor 430, a central processing unit (CPU) 440 and a memory and storage unit 450. The input device 410 comprises a conventional keyboard 412 and a touch sensor 415 which overlays the conventional keyboard 410 as described in FIGS. 1-3. The conventional keyboard 412 and the touch sensor 415 form the keyboard-mouse combo device. The I/O processor 430 is the hardware that executes the keyboard-mouse combo software.

FIG. 5 is a flow chart diagram illustrating steps of an operation of the keyboard-mouse combo device of the embodiment of the present invention. The keyboard-mouse operation starts with a checking if any touch on the designated area 310 of the keyboard 105 in step 510. If there is no touch, the keyboard-mouse operation performs no further action and returns to step 510. If touches on the designated area 310 of the keyboard 105 are detected in step 510, the keyboard-mouse operation will proceed to checking if the designated area 310 of the keyboard 105 is touched at more than one location. In case more than one location is touched simultaneously, the operation enters a keyboard mode in step 525. In the keyboard mode, the keyboard-mouse combo device functions as a regular keyboard accepting a key press as a way to enter a command or a character, and ignoring touches or movements of the touches on the surface of the keyboard 105. After step 525, the keyboard-mouse operation returns to step 510, i.e., the keyboard-mouse operation constantly checks if there is any touch on the surface of the keyboard 105. If only at one location within the designated touch sensing area 310 is touched, the keyboard-mouse operation enters a mouse mode in which the single touch location will be translated into a cursor location on the display 420, and a key pressing will be equivalent to a conventional mouse click instead of entering a command or character as a conventional keyboard key does.

Referring again to FIG. 5, after entering the mouse mode, the keyboard-mouse combo device checks if the "AUX" key 322 of FIG. 3 is being held down while the keyboard touch occurs in step 530. If the "AUX" key 322 is held down in step 530, the keyboard-mouse combo device checks if any keyboard key within the touch sensing area 310 is being pressed in step 540. In case at least one keyboard key within the touch sensing area 310 is pressed while the "AUX" key 322 is being held down, the I/O processor 430 translates the keyboard-mouse operation into a secondary click in step 543, and then returns the keyboard-mouse operation to step 510. If there is no keyboard key being pressed, then the I/O processor 430 obtains the coordinates of the single touch and translates the coordinates to an image location in a scrolling operation in step 546. In other words, when the "AUX" key 322 is held down, a single touch movement (without keyboard key press) is equivalent to the scrolling operation in a conventional mouse, in which an image in an active window scrolls either vertically or horizontally in response to the turns of a scrolling wheel. For instance, when a finger remains in touch with and slides on the surface of keyboard 105 toward left, the image scrolls to the left—while the "AUX" key 322 is being held down. After the execution of the step 546, the keyboard-mouse operation returns to step 510.

Referring again to FIG. 5, after step 520, if the "AUX" key 322 is not being held down in step 530, the keyboard-mouse operation checks if any keyboard key within the touch sensing area 310 is pressed in step 560. If there is at least one keyboard key within the touch sensing area 310 being pressed, the I/O processor 430 translates the keyboard-mouse operation into a primary click in step 563. The primary click may select/activate an object on the display 420. Then the keyboard-mouse operation checks if the "AUX" key 322 begins to be held down after the previously pressed keyboard key(s) remained pressed-down in step 570. If both the "AUX" key 322 and the keyboard key(s) are held down in step 570, the I/O processor 430 obtains the coordinates of the single touch and translates the coordinates to a cursor location and a location of the object selected/activated by the primary click in step 575. Then the keyboard-mouse operation returns to step 510. On the other hand, if the "AUX" key 322 is not held down while a keyboard key is pressed, the keyboard-mouse operation will proceed to step 550, in which the previously pressed keyboard key (producing the primary click) is monitored for a second press within a predetermined time after the primary click in step 563. If the keyboard key is pressed twice within the predetermined time, the keyboard-mouse operation will be interpreted as an operation equivalent to a double-click by a conventional mouse, and execute the object selected by the primary click in step 555. Then the keyboard-mouse operation returns to step 510.

Referring again to FIG. 5, in case there is no keyboard key within the touch sensing area 310 being pressed according to step 560, the touch sensor 415 will detect the touch and the I/O processor 430 will extract the coordinates of the touch and translate the coordinates to a cursor location in step 566. When a finger remains on and slides across the designated keyboard surface area 310, such finger movement will be translated as an equivalence of a conventional mouse movement. After step 566, the keyboard-mouse operation returns to step 510.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A computer input device comprising:
a keyboard having a plurality of mechanical keys for entering commands and characters into the computer, the keyboard having a designated contiguous surface area overlaying a portion of the plurality of keys for touch sensing, one of said plurality of keys located outside of the designated contiguous surface area and is designated as an auxiliary key for producing alternative mouse mode operations when used in combination with the touch sensing and the plurality of keys within the designated contiguous surface area;

a touch sensor for detecting one or more touches by one or more objects on the designated contiguous surface area of the keyboard; and an input processor coupled to the keyboard and the touch sensor, wherein the input processor is configured to switch the computer input device into a mouse mode when the touch sensor having detected the designated contiguous surface area being touched by a single object, and the input processor is configured to switch the computer input device into a keyboard mode when the touch sensor having detected the designated contiguous surface area being touched by two or more objects.

2. The computer input device of claim 1, wherein the touch sensor has an optical emitter and an optical receiver.

3. The computer input device of claim 1, wherein the input processor is configured to ignore touch locations in the keyboard mode.

4. The computer input device of claim 1, wherein the input processor is configured to ignore any movement of the touching objects in the keyboard mode.

5. The computer input device of claim 1, wherein the object is a finger of a computer operator.

6. The computer input device of claim 1, wherein the input processor is configured to translate coordinates of a single touch on the designated contiguous surface area of the keyboard into cursor location information on a display of the computer.

7. The computer input device of claim 1, wherein the input processor is configured to convey a primary click operation to the computer when one or more of the plurality of keys within the designated contiguous surface area are pressed in the mouse mode.

8. The computer input device of claim 1, wherein the input processor is configured to convey a double-click operation when one or more of the plurality of keys within the designated contiguous surface area are pressed at least twice within a predetermined period of time in the mouse mode.

9. The computer input device of claim 1, wherein the alternative mouse mode operation is a secondary click enacted by pressing the auxiliary key and at least one of the plurality of keys within the designated contiguous surface area at approximately the same time.

10. The computer input device of claim 1, wherein the alternative mouse mode operation is a scrolling operation enacted by holding down the auxiliary key while no key within the designated contiguous surface area is being pressed, and a single moving touch within the designated contiguous surface area is being detected by the touch sensor.

11. The computer input device of claim 1, wherein the touch sensor senses an area larger than the designated contiguous surface area.

\* \* \* \* \*